Patented Mar. 25, 1952

2,590,517

UNITED STATES PATENT OFFICE 2,590,517

METHOD FOR THE PREPARATION OF PEP-
TONE AND AMINO ACID CONTAINING EX-
TRACTS FROM PRESS WATER

Christian Drangsholt, Oslo, Norway

No Drawing. Application March 22, 1948, Serial
No. 16,402. In Norway March 27, 1947

2 Claims. (Cl. 195—29)

For the preparation of peptone and amino acid containing extracts from press water, it is previously suggested to evaporize the press water under pressure after addition of acid for the decomposition, complete or in part, of the proteins, and then to treat the press water with enzymes, such as pepsin, in order to transform eventually remaining proteins and albumoses to pepton.

This process requires considerable quantities of heat, and further the highly acetous solution is highly corrosive to the material in the evaporator during evaporation under pressure.

The present invention relates to a method by which the evaporation of the acetous solution under pressure is avoided thereby, that special enzymes are used as a substitute for the hydrolysis effected by evaporation under pressure of the acetous protein solution.

When the press water is treated, in a manner known per se, with lime, with or without preceding pepsin hydrolysis, the pH value is, according to the invention, raised to 8 to 9, and the press water is brought to a temperature of 35 to 40° C. in a manner known, in water bath or by a thermostat controlled heat source, whereupon additional enzymes such as pancreatin and erepsin are added until the optimal hydrolysis velocity is obtained. The lime previously added serves as an activator to the trypsinogen of the pancreatin, so as to give active trypsin. This enzyme decomposes a substantial portion of proteins contained in the press water into amino acids.

The fatty substances contained in the press water the removal of which otherwise is difficult, are decomposed by the lipase of the pancreatin into fatty acids and glycerine. Conveniently the lipase is activated by a suitable substance for instance bile, the activator, being added when the hydrolysis has gone for some time, for instance one hour.

The fatty acids liberated react with the lime present forming insoluble lime soaps, which are separated out by passing the hydrolysed press water through a sand filter in known manner. The sand filter also retains possibly not hydrolysed particles of the substrate.

The filtered water is then treated in usual manner in a vacuum evaporator. The product obtained is an extract in which most of the proteins of the press water is completely hydrolysed.

Example

Tests were made by evaporation under vacuum of 1 kg. press water of herring containing 0.4 per cent fatty substances, about 3 per cent dissolved proteins, about 2 per cent suspended protein substances and some mineral salts (about 0.8 per cent).

(1). Press water which was not treated with lime and pancreatin was firstly evaporated to increase the content of dry material from about 6 per cent to about 50 per cent, with a specific weight of about 1.2 at 20° C. A nitrogen analysis showed about 5.7 per cent of protein nitrogen and 1.02 per cent nitrogen in the form of amino acid.

(2). Press water which was treated with lime and pancreatin for 5 hours at pH 8.5 and at a temperature of 35 to 40° C. was then evaporated as by test 1. The analysis showed 1.6 per cent protein nitrogen and 5.0 per cent nitrogen in the form of amino acids. The amino acids nitrogen was defined by formal titration according to the method of S. P. L. Sørensen.

When treated according to the method described under 2, 1000 kg. press water will yield 30 to 35 kg. amino acids, about 10 kg. pepton and about 7 kg. mineral salts. Tests have, however, proved that a small addition of erepsin raise the hydrolysis effect so as to increase the yield to 45 kg. amino acids per 1000 kg. press water.

What I claim is:

1. A method for the preparation of pepton- and amino acid from a solution containing protein and fatty materials comprising the steps of alkalizing the solution to a pH value of 8 to 9, subjecting the alkaline solution to proteolysis by means of pancreatin to split the protein in the solution into polypeptides, peptones and amino acids, and to form insoluble fatty acid salts, adding bile to the solution subsequent to the addition of pancreatin, whereby the lipase of the pancreatin is activated to accelerate the decomposition of the fatty materials present in the solution into fatty acids, thereafter separating the insoluble components by filtration, and evaporating the solution to recover the soluble components.

2. A method for the preparation of pepton- and amino acid containing extracts from press water from sea animal oil presses comprising the steps of alkalizing the press water with lime to a pH value of 8 to 9, adding pancreatin to the alkalized solution whereby the solution is subjected to proteolysis by means of the trypsinogen of pancreatin which is activated to trypsin by the presence of lime, and whereby the protein in the press water is split into polypeptides, peptones and amino acids, adding bile to the solution subsequent to the addition of pancreatin, whereby the lipase of the pancreatin is activated to accelerate the decomposition of the fatty materials present in the solution into fatty acids, filtering out of the solution the insoluble resultants of the lime and fatty acids present in the press water, and evaporating the filtrate to recover the soluble components.

CHRISTIAN DRANGSHOLT.

REFERENCES CITED

The following references are of record in the file of this patent:

UNITED STATES PATENTS

| Number | Name | Date |
|---|---|---|
| 369,729 | Merk | Sept. 13, 1887 |
| 1,403,892 | Butterfield | Jan. 17, 1922 |
| 1,561,955 | Takamine | Nov. 17, 1925 |
| 2,180,637 | Kemmerer | Nov. 21, 1939 |
| 2,403,174 | Ernst | July 2, 1946 |
| 2,454,315 | Gunther et al. | Nov. 23, 1948 |

OTHER REFERENCES

General Chemistry of the Enzymes by Euler, 1912 ed., pp. 36 and 37, published by John Wiley & Sons, New York.